United States Patent
Kim et al.

(10) Patent No.: US 7,208,434 B2
(45) Date of Patent: Apr. 24, 2007

(54) DIELECTRIC CERAMIC COMPOSITION OF FORSTERITE SYSTEM FOR MICROWAVE AND MILLIMETER-WAVE APPLICATION AND METHOD FOR FORMING THE SAME

(75) Inventors: Dong Young Kim, Daejeon (KR); Hong Yeol Lee, Chungcheongbuk-do (KR); Dong Suk Jun, Daejeon (KR); Sang Seok Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 32 days.

(21) Appl. No.: 10/895,690

(22) Filed: Jul. 19, 2004

(65) Prior Publication Data

US 2005/0130831 A1    Jun. 16, 2005

(30) Foreign Application Priority Data

Dec. 12, 2003  (KR)  .................. 10-2003-0090549

(51) Int. Cl.
*C04B 35/20* (2006.01)
*C04B 35/465* (2006.01)

(52) U.S. Cl. .................... 501/122; 501/136

(58) Field of Classification Search ............. 501/122, 501/136
See application file for complete search history.

(56) References Cited

U.S. PATENT DOCUMENTS

| | | | |
|---|---|---|---|
| 4,608,215 A | | 8/1986 | Gonczy et al. |
| 5,916,834 A | * | 6/1999 | Terashi et al. .............. 501/135 |
| 6,673,731 B2 | * | 1/2004 | Hahn et al. ................. 501/120 |

FOREIGN PATENT DOCUMENTS

| | | |
|---|---|---|
| JP | 05-116929 | 5/1993 |
| JP | 05-345662 | * 12/1993 |
| JP | 2000-103641 | 4/2000 |
| JP | 2001-1130952 | * 5/2001 |
| JP | 2002-104870 | 4/2002 |
| SU | 275192 | * 2/1971 |

(Continued)

OTHER PUBLICATIONS

Translation of Japanese document 2000-104870, Oct. 4, 2002.*

(Continued)

*Primary Examiner*—Karl Group
(74) *Attorney, Agent, or Firm*—Blakely Sokoloff Taylor & Zafman

(57) ABSTRACT

Provided are a dielectric ceramic composition of forsterite system for microwave and millimeter-wave application and a method for forming the same. Here, the dielectric ceramic composition having a small dielectric loss is used for communication devices used at microwave and millimeter-wave bands. The dielectric ceramic composition includes forsterite ($Mg_2SiO_4$) as a main element and titanium oxide ($TiO_2$), which is partially substituted for silicon (Si) in forsterite. The dielectric ceramic composition is obtained by using 56 to 57 wt % of MgO, 33 to 42 wt % of $SiO_2$, and 1 to 11 wt % of $TiO_2$, and adding an additive including Li ions as a sintering aid for improving a sintering characteristic. The dielectric ceramic composition is formed by mixing MgO, $SiO_2$, and $TiO_2$, calcining the mixture to form forsterite powder, adding an additive including Li ion, for example, $Li_2CO_3$, and shaping and sintering the mixture.

6 Claims, 3 Drawing Sheets

OTHER PUBLICATIONS

S.R. Lacerda et al., "$TIO_2$-induced phase separation and crystallization in $SiO_2$-$3CaOP_2O_5$-MgO glass", Journal of Non-Crystalline Solids 221 (1997) 255-260.

Matthew B.D. Mitchell et al., "Preparation and characterisation of forsterite ($Mg_2 SiO_4$) aerogels", Journal of Non-Crystalline Solids 225 (1998) 125-129.

Emad Mastafa et al., "Sintering and microstructure of spinel-forsterite bodies", Ceramics International 28 (2002) 663-667.

"Microwave Dielectric Properties of Forsterite Based Ceramics", D. Kim, et al., Proceeding of the Kieeme Annual Autumn Conference 2003, Nov. 13-15, 2003.

* cited by examiner

US 7,208,434 B2

DIELECTRIC CERAMIC COMPOSITION OF FORSTERITE SYSTEM FOR MICROWAVE AND MILLIMETER-WAVE APPLICATION AND METHOD FOR FORMING THE SAME

BACKGROUND OF THE INVENTION

This application claims the priority of Korean Patent Application No. 2003-90549, filed on Dec. 12, 2003, in the Korean Intellectual Property Office, the disclosure of which is incorporated herein in its entirety by reference.

1. Field of the Invention

The present invention relates to a dielectric ceramic composition for passive devices, such as microwave and millimeter-wave band pass filters and a duplexer, and more particularly, to a dielectric ceramic composition of forsterite system for microwave and millimeter-wave application and a method for forming the same.

2. Description of the Related Art

Frequencies of a millimeter-wave band, which are ultra-high frequencies of over 30 GHz, are investigated to be used for a next-generation communication service. The frequencies of the millimeter-wave band can transfer many bits of information by using a broadband characteristic, and the same frequency band can be used in adjacent areas without interference because the electromagnetic wave of these frequencies is easily attenuated in the air, so that researchers are interested in the frequencies of the millimeter-wave band. Accordingly, information communication service and system using the millimeter-wave frequencies are developed, and various devices required in the service and the system using the millimeter-wave frequencies are researched and developed. In addition, it is also required to develop a new dielectric ceramic composition for millimeter-wave band application. In particular, in the case of a passive device using a nonradiative dielectric (NRD) guide, the dielectric loss of the dielectric composition is closely related to the insertion loss of a passive device. Thus, it is required to develop a dielectric composition with low dielectric loss characteristics.

Forsterite ceramic is formed of MgO and $SiO_2$ at the ratio of 2:1 and represented as $Mg_2SiO_4$. The forsterite ceramic has characteristics of a high thermal expansion coefficient and a high melting point of 1920° C. Forsterite is industrially used as a substrate for electronic devices, a sealing material for ceramic and metal, and a bonding material at a high temperature. In addition, forsterite is used as one of important refractories in the steel industry. It is known that forsterite has characteristics of a low dielectric constant and a low dielectric loss. In addition, forsterite is evaluated as a material of satisfying a low dielectric loss characteristic, which is urgently required for a dielectric material for the microwave and millimeter-wave band application.

However, in the case of the single-phased forsterite synthesized by a solid state reaction method, a sintering temperature is very high, resulting in an incomplete densification even at a temperature of 1,650° C. As a result, the dielectric constant is lowered and the dielectric loss is increased due to these incomplete densification. Accordingly, researches for improving the sintering characteristic by synthesizing powders in a wet method that easily controls the composition or by adding an additiveal composition have been performed. However, researches on the dielectric characteristic of forsterite have rarely performed.

SUMMARY OF THE INVENTION

The present invention provides a dielectric ceramic composition of forsterite system for microwave and millimeter-wave application that has excellent sintering characteristic and dielectric characteristic.

The present invention also provides a method for forming a dielectric ceramic composition of forsterite system for microwave and millimeter-wave application that has a high density and an excellent dielectric characteristic.

According to an aspect of the present invention, there is provided a dielectric ceramic composition for microwave and millimeter-wave application comprising forsterite ($Mg_2SiO_4$) as a main element and $TiO_2$, which is partially substituted for Si in forsterite. The dielectric ceramic composition comprises 56 to 57 wt % of MgO, 33 to 42 wt % of $SiO_2$, and 1 to 11 wt % of $TiO_2$.

The dielectric ceramic composition further comprises an additive including Li ions. The additive including Li ions may be any one of $Li_2CO_3$ and $Li_2SiO_3$. The dielectric ceramic composition may comprise 0.1 wt % of $Li_2CO_3$ as the additive including Li ions.

According to another aspect of the present invention, there is provided a method for forming a dielectric ceramic composition for microwave and millimeter-wave application. First, a mixture of MgO, $SiO_2$, and $TiO_2$ is calcined at 1,200° C. An additive including Li ions is mixed with these calcined powders, and the mixture is sintered at the temperature between 1,400 and 1,650° C.

0.1 wt % of $Li_2CO_3$ may be added as the additive including Li ions when forming the mixture.

The provided dielectric ceramic composition can reduce a sintering temperature by more than 200° C., and the Q*f value of a sintered body can be largely increased. In addition, the sintered body having an excellent dielectric characteristic and a dielectric constant between about 7 and 8 can be formed.

BRIEF DESCRIPTION OF THE DRAWINGS

The above and other features and advantages of the present invention will become more apparent by describing in detail an exemplary embodiment thereof with reference to the attached drawings in which.

DETAILED DESCRIPTION OF THE INVENTION

The present invention will now be described more fully with reference to the accompanying drawings, in which an exemplary embodiment of the invention is shown.

A dielectric ceramic composition of a low dielectric loss for microwave and millimetre-wave band application and a method for forming the same will now be described. The dielectric ceramic composition for microwave and millimeter-wave application comprises forsterite as a main element and $TiO_2$, which is partially substituted for Si in forsterite. The dielectric ceramic composition comprises 56 to 57 wt % of MgO, 33 to 42 wt % of $SiO_2$, and 1 to 11 wt % of $TiO_2$. The dielectric ceramic composition further comprises an additive including Li ions. additive including Li ions may be any one of $Li_2CO_3$ and $Li_2SiO_3$. The dielectric ceramic composition may comprise 0.1 wt % of $Li_2CO_3$ as the additive including Li ions.

In the present invention, an additive including Li ions is added to pure forsterite to improve a sintering characteristic and a dielectric characteristic of forsterite, resulting in obtaining the dielectric ceramic composition for microwave and millimetre-wave band application having a high density and an excellent dielectric characteristic even at a sintering temperature of 1,500° C., which is much lower than a sintering temperature of pure forsterite.

Figure 1:
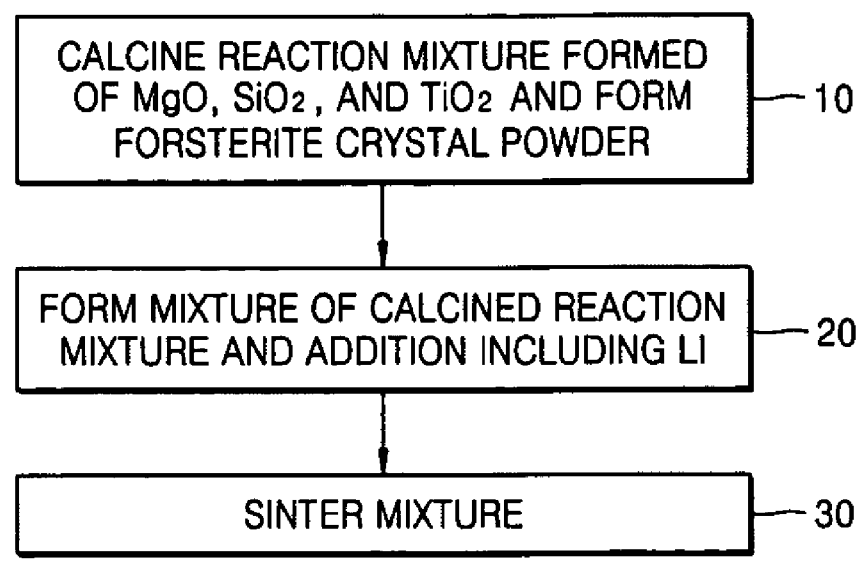
FIG. 1 is a flowchart for explaining a method for forming a dielectric ceramic composition for microwave and millimeter-wave application according to the present invention.

FIG. 1 is a flowchart for explaining a method for forming the dielectric ceramic composition for the microwave and millimetre-wave application according to the present invention.

Referring to FIG. 1, a mixture of MgO, $SiO_2$, and $TiO_2$ is calcined at 1,200° C. for about 6 hours, in step 10. In the calcination stage, a solid state reaction is performed at 1,200° C. until the forsterite phase is formed.

A mixture is formed by adding an additive including Li ions as a sintering aid to the calcined forsterite powder, in step 20. Here, 0.1 wt % of $Li_2CO_3$ may be added as a sintering aid.

After the mixture is pressed into a predetermined shape, it is sintered at a temperature of about 1,500 to 1,600° C., in step 30.

An embodiment of the method for forming a dielectric ceramic composition for microwave and millimetre-wave application will now be described.

When the pure forsterite is sintered at a temperature of lower than 1,500° C., a quality factor is very low, because the sintered body is not completely densified. When the pure forsterite is sintered at a temperature of higher than 1,550° C., the quality factor becomes over 30,000. However, such a material is not suitable for being used in the millimetre-wave band. Accordingly, researches for reducing the sintering temperature by adding a sintering aid take place.

Figure 2:
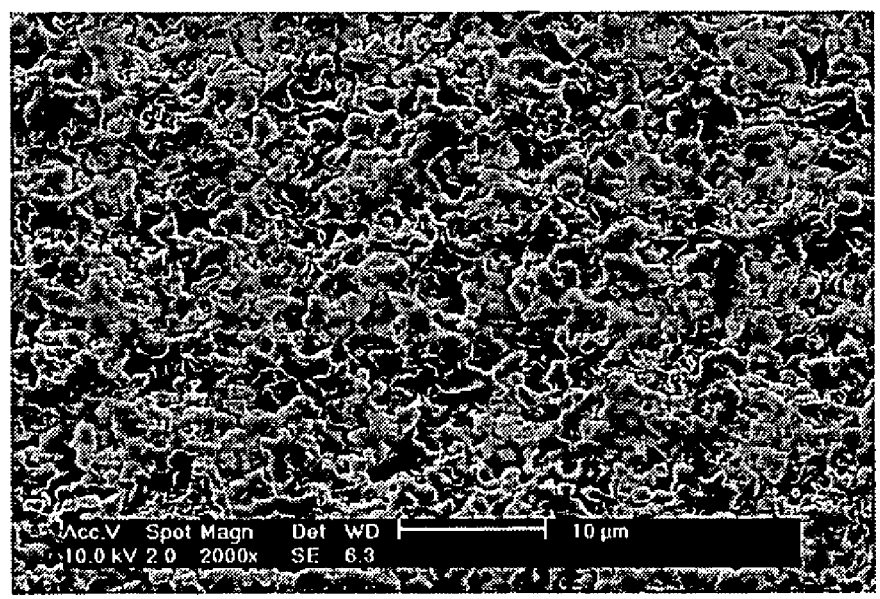
FIG. 2 is a photograph illustrating a microstructure of a pure forsterite sintered body.
Figure 3:
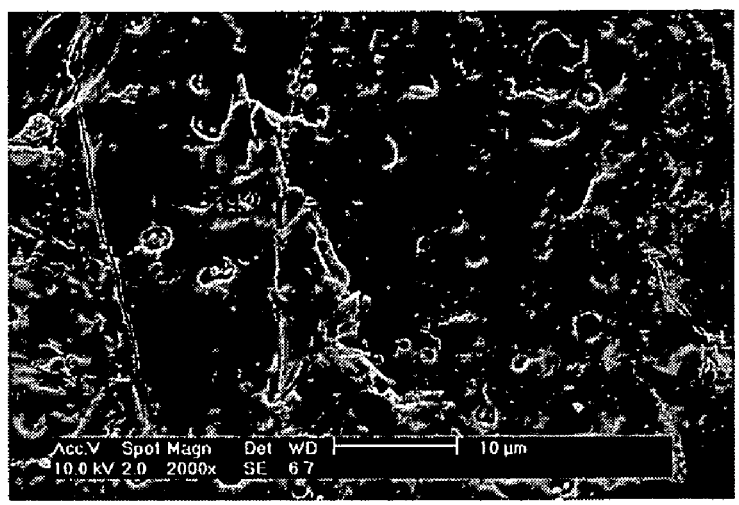
FIGS. 3 through 5 are photographs illustrating microstructures of sintered body, which are obtained by adding 2 wt % of $Al_2O_3$, $Li_2SiO_3$, and $Li_2CO_3$ as sintering aids to the pure forsterite of FIG. 2, respectively, and sintering at 1,550° C. for four hours.
Figure 4:
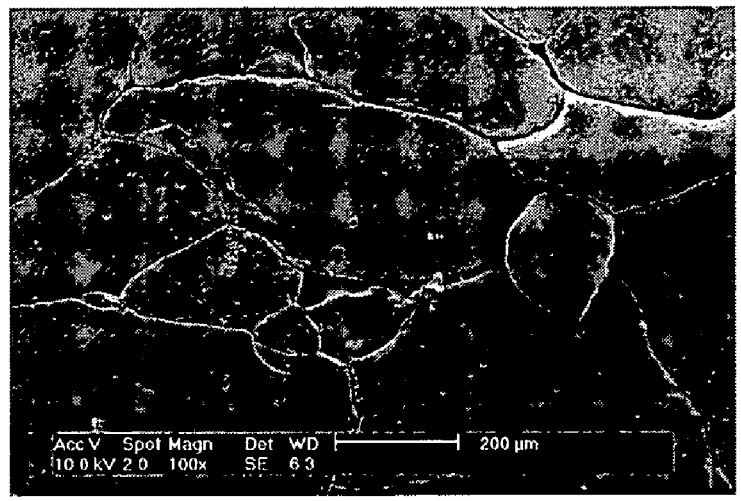
Figure 5:
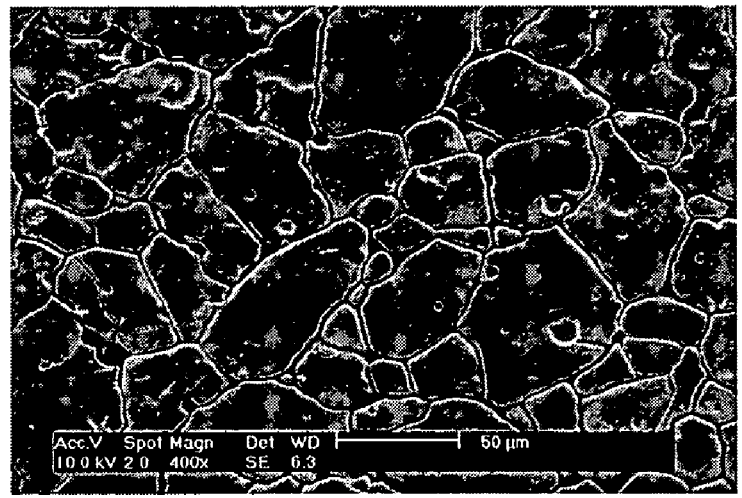

FIG. 2 is a photograph illustrating a microstructure of a pure forsterite, and FIGS. 3 through 5 are photographs illustrating microstructures of sintered bodies, which are obtained by adding an excess amount of 2 wt % of $Al_2O_3$, $Li_2SiO_3$, and $Li_2CO_3$ as sintering aid to the pure forsterite, respectively, and sintering at a temperature of 1,550° C. for four hours.

Referring to FIG. 2, the pure forsterite is not completely densified even at a temperature of 1,550° C., resulting in a structure having a large number of pores.

Referring to FIG. 3, the grain size of the sintered material to which $Al_2O_3$ is added as the sintering aid is increased. However, it is unknown whether they are real grains, because the boundaries of the grains are uncertain. In addition, there are a large number of cracks inside the sintered material that have a bad effect on the dielectric characteristic of the dielectrics. Based on the result of the dielectric measurement of the sintered body added $Al_2O_3$ as the sintering aid, as the sintering temperature is increased, the dielectric quality factor is increased. However, a maximum Q*f value, which is obtained by multiplying a measuring frequency and the quality factor, is relatively low as 55,000.

Referring to FIG. 4, the grains are actively grown in the case where $Li_2CO_3$ is added as the sintering aid. Here, the average grain size is increased to 400 µm, and the sintered body is highly dense without pores. It is estimated that such a dense dielectrics has an excellent dielectric quality factor, and it is measured that the dielectric quality factor of the sintering material of FIG. 4 is about 90,000.

Referring to FIG. 5, the sintering material to which $Li_2SiO_3$ is added as a sintering aid has a fine structure. Here, the average size of the grains is about 50 µm, which is smaller than the case where $Li_2CO_3$ is added. The sintering material is sintered at a temperature of 1,350° C., which is lowered due to $Li_2SiO_3$ as the sintering aid, however, the quality factor is relatively low as about 58,000.

It is determined that $Li_2CO_3$ is the most suitable sintering aid based on the results shown in FIGS. 2 through 5.

Figure 6:
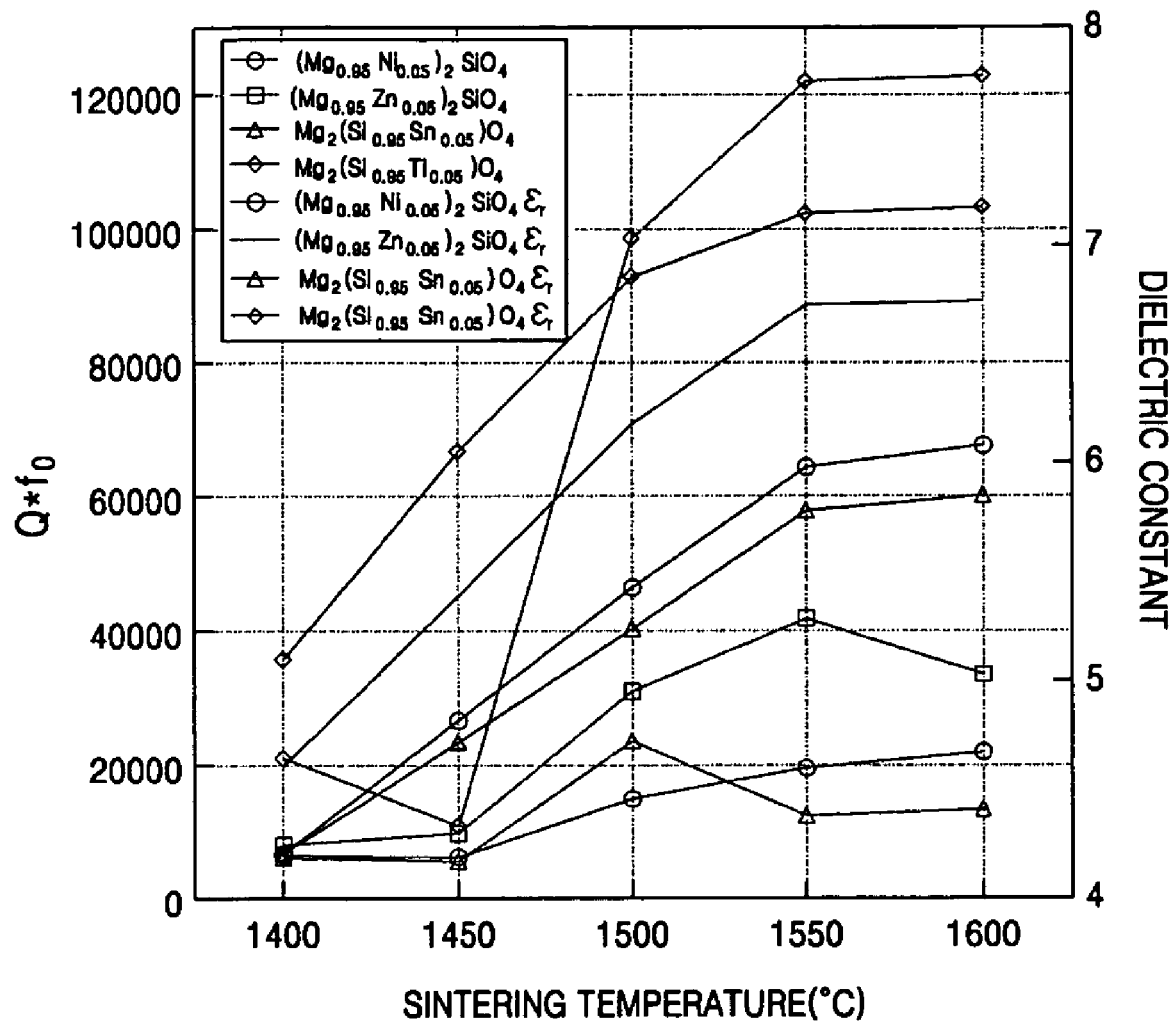
FIG. 6 is a graph illustrating changes in dielectric characteristics of forsterite sintered bodies to which various sintering aids are added, according to a sintering temperature.

FIG. 6 is a graph illustrating changes in the dielectric characteristics of the forsterite ceramics to which various materials are added, according to the sintering temperature.

In order to examine the effect of the additives on the improvement of the dielectric characteristic of forsterite, a part of Mg in forsterite is substituted by Ni and Zn, and a part of Si is substituted by Sn and Ti, and the changes in the dielectric characteristic are examined. The dielectric characteristics of the sintering materials to which Ni, Zn, Sn, and Ti are added are shown in FIG. 6.

Referring to FIG. 6, the dielectric quality factors of the specimen in which Ni and Zn are substituted for Mg are not significantly improved but increased as the sintering temperature is increased. However, the specimen of $Mg_2(Si_{0.95}Ti_{0.05})O_4$ including Ti has a high Q*f value of over 100,000 at a sintering temperature of over 1,500° C. When considering the condition of not adding a sintering aid to the specimen, it is determined that $TiO_2$ greatly improves the dielectric characteristic of forsterite. However, in the phase equilibrium diagram of $Mg_2SiO_4$—$Mg_2TiO_4$ pseudo binary system, a solid solution in which Ti is substituted for Si is not formed. Instead, $TiO_2$ reacts with MgO to form $Mg_2TiO_4$, resulting in the existence of a material having two phases of $Mg_2SiO_4$ and $Mg_2TiO_4$ at a temperature of lower than 1,520° C. It is known that $Mg_2TiO_4$ has larger dielectric constant and dielectric quality factor than forsterite. In addition, it is determined that the material formed by adding $TiO_2$ to forsterite represents a large dielectric quality factor due to $Mg_2TiO_4$.

Based on the above result, dielectric ceramic compositions for the microwave and millimeter-wave application were formed according to the embodiment of the present invention.

First, 56 to 57 wt % of MgO, 33 to 42 wt % of $SiO_2$, and 1 to 11 wt % of $TiO_2$ were mixed by using ethanol as a medium for about 12 hours, and dried at a temperature of 100° C. for 12 hours. In order to form forsterite crystal powder, a phase synthesis through a solid state reaction at a high temperature was required. In the present embodiment, the forsterite crystal powder was obtained through a thermal process at a temperature of 1,200° C. for about 6 hours.

Thereafter, a small amount of $Li_2CO_3$ is added as an additiveal composition for promoting sintering to the forsterite powder, and $Li_2CO_3$ and the forsterite powder were mixed by using ethanol as a medium for 24 hours and crushed by ball milling. Then, the crushed mixture was dried at a temperature of 100° C. for 12 hours to form powder. The powder was input to a cylinder shaped mold having a diameter of 20 mm and formed into a disc shape under a pressure of about 1,500 kg/cm². Then, the disc was sintered at a temperature of about 1,400 to 1,650° C. for about 4 hours to obtain a dielectric ceramic composition specimen for microwave application.

The sintered specimen was mounted in a circular resonator, and the dielectric loss of the specimen was measured at a microwave frequency by using a vector network analyzer (VNA). In addition, the dielectric constant of the specimen was obtained by using a parallel plate method. In general, the dielectric quality factor is dependent on the frequency. Accordingly, as the frequency increases, the dielectric quality factor linearly decreased, resulting in a constant Q*f value regardless of the frequencies. Thus, the dielectric quality factor at the microwave band was obtained from the dielectric loss, and the Q*f value was obtained by multiplying the frequency to the quality factor. In addition, the sintering density of the dielectric specimen was obtained by an Archimedes method.

The compositions of the forsterite ceramic dielectrics used in the present embodiment are shown in Table 1.

TABLE 1

| | MgO (wt %) | $SiO_2$ (wt %) | $TiO_2$ (wt %) | $Li_2CO_3$ (wt %) |
|---|---|---|---|---|
| forsterite | 57.3 | 42.7 | 0 | 0 |
| composition A | 57.1 | 41.7 | 1.1 | 0.1 |
| composition B | 56.8 | 40.3 | 2.8 | 0.1 |
| composition C | 55.9 | 34.6 | 9.4 | 0.1 |
| composition D | 55.7 | 34.2 | 11 | 0.1 |

The sintering densities and dielectric characteristics of the dielectric ceramic compositions of forsterite system that are formed according to the present embodiment are shown in Table 2.

TABLE 2

| composition | sintering temperature | sintering density (g/cm³) | dielectric constant | Q * f (GHz) |
|---|---|---|---|---|
| $Mg_2SiO_4$ | 1,450° C. | 2.48 | 5.35 | 14780 |
| | 1,500° C. | 2.61 | 5.36 | 22791 |
| | 1,550° C. | 2.60 | 5.73 | 30968 |
| | 1,600° C. | 2.64 | 5.72 | 31037 |
| | 1,650° C. | 2.61 | 5.59 | 37606 |
| composition A | 1,450° C. | 3.12 | 7.14 | 73537 |
| | 1,500° C. | 3.10 | 6.86 | 90223 |
| | 1,525° C. | 3.09 | 6.95 | 103225 |
| | 1,550° C. | 3.09 | 6.92 | 107186 |
| | 1,575° C. | 3.09 | 6.96 | 100134 |
| composition B | 1,450° C. | 2.56 | 5.76 | 47405 |
| | 1,475° C. | 2.79 | 7.60 | 124417 |
| | 1,500° C. | 2.97 | 7.56 | 156427 |
| | 1,525° C. | 2.95 | 7.13 | 170772 |
| | 1,550° C. | 3.05 | 7.38 | 174780 |
| | 1,575° C. | 3.05 | 7.29 | 165941 |
| composition C | 1,450° C. | 2.50 | 5.84 | 33559 |
| | 1,475° C. | 2.72 | 6.79 | 47013 |
| | 1,500° C. | 2.93 | 7.60 | 105623 |
| | 1,525° C. | 3.09 | 8.09 | 145558 |
| | 1,550° C. | 3.14 | 8.08 | 165326 |
| | 1,575° C. | 3.17 | 8.21 | 161256 |
| composition D | 1,450° C. | 3.19 | 8.25 | 100098 |
| | 1,500° C. | 3.24 | 8.36 | 123788 |
| | 1,525° C. | 3.23 | 8.09 | 143813 |
| | 1,550° C. | 3.23 | 8.35 | 147671 |
| | 1,575° C. | 3.24 | 8.24 | 149342 |

As shown in Table 2, the pure forsterite to which $Li_2CO_3$ as the sintering aid and the $TiO_2$ as the additional composition were not added had a low sintering density, a low dielectric constant as about 5.6, and a low quality factor as about 37,600, even when sintered at a temperature of 1,650° C. Accordingly, it is known that the pure forsterite was not sintered well at the temperature of 1,650° C.

On the other hand, in the case where 0.1 wt % of $Li_2CO_3$ as the sintering aid and 1 wt % of $TiO_2$ were added to the pure forsterite, the sintering density, the dielectric constant, and the quality factor were increased. However, the maximum dielectric quality factor was about 100,000, which is not sufficient to be used at the millimeter-wave band.

When 2.8 wt % of $TiO_2$ was added, the Q*f value of the sintered material, which was sintered at a temperature of 1,500° C., was over 150,000. It means that the sintered material can be obtained at a temperature lower than the temperature for the pure forsterite by more than 200° C. In addition, the Q*f value of the sintered material, which was sintered at a temperature of 1,525° C., was over 170,000. As a result, it is known that $Li_2CO_3$ and $TiO_2$ improved the dielectric characteristics of the forsterite dielectric. When 2.8 to 9.4 wt % of $TiO_2$ was added, as the added amount of $TiO_2$ was increased, the Q*f value was gradually decreased and the dielectric constant was increased. When 11 wt % of $TiO_2$ was added, the Q*f value was decreased to lower than 150,000 at any temperature.

Accordingly, it is possible to form the dielectric composition providing the excellent dielectric loss characteristic, such as the Q*f value of over 150,000 and the dielectric constant in the range of 7.1 to 8, by controlling the added amount of $TiO_2$.

The dielectric ceramic composition for microwave and millimeter-wave application according to the present invention is formed of forsterite ($Mg_2SiO_4$) as a main element and $TiO_2$, which is substituted for a part of Si. The dielectric ceramic composition according to the present invention is obtained by adding 0.1 wt % of $Li_2CO_3$ as the sintering control material to forsterite, which is formed of 56 to 57 wt % of MgO, 33 to 42 wt % of $SiO_2$, and 1 to 11 wt % of $TiO_2$. When the dielectric ceramic composition according to the present invention is used, the sintering temperature can be lowered by about 200° C. and the Q*f value of the sintered material is largely increased by addition of $Li_2CO_3$ and $TiO_2$. In addition, the sintered material having excellent dielectric characteristics and the dielectric constant of about 7 to 8 is manufactured.

While the present invention has been particularly shown and described with reference to the exemplary embodiment thereof, it will be understood by those of ordinary skill in the art that various changes in form and details may be made therein without departing from the spirit and scope of the present invention as defined by the following claims.

What is claimed is:

1. A dielectric ceramic composition for microwave and millimeter-wave application, the composition comprising forsterite ($Mg_2SiO_4$) as a main element and titanium oxide ($TiO_2$), which is partially substituted for silicon (Si) in forsterite.

2. The dielectric ceramic composition of claim 1, comprising 56 to 57 wt % of MgO, 33 to 42 wt % of $SiO_2$, and 1 to 11 wt % of $TiO_2$.

3. The dielectric ceramic composition of claim 2, further comprising an additive including Li ion.

4. The dielectric ceramic composition of claim 3, wherein the additive including Li ions is $Li_2CO_3$ or $Li_2SiO_3$.

5. A dielectric ceramic composition for microwave and millimeter-wave application, the composition comprising forsterite ($Mg_2SiO_4$) as a main element and titanium oxide ($TiO_2$), which is partially substituted for silicon (Si) in forsterite, the dielectric ceramic composition comprising 56 to 57 wt % of MgO, 33 to 42 wt % of $SiO_2$ and 1 to 11 wt % of $TiO_2$ and further comprising 0.1 wt % of $Li_2CO_3$ as an additive including Li ion.

6. The dielectric ceramic composition of claim 1, formed of crystal powder only.

* * * * *